(12) United States Patent
Imada

(10) Patent No.: US 7,639,932 B2
(45) Date of Patent: Dec. 29, 2009

(54) IMAGING APPARATUS

(75) Inventor: Shinji Imada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 467 days.

(21) Appl. No.: 11/549,507

(22) Filed: Oct. 13, 2006

(65) Prior Publication Data
US 2007/0110418 A1 May 17, 2007

(30) Foreign Application Priority Data
Nov. 16, 2005 (JP) ............... 2005-331425

(51) Int. Cl.
G03B 17/00 (2006.01)
G02B 27/14 (2006.01)

(52) U.S. Cl. ............... 396/52; 396/53; 396/55; 359/554; 359/557

(58) Field of Classification Search ............ 396/52–55, 396/100, 153; 348/208.1, 208.15, 208.99; 359/554–557
See application file for complete search history.

(56) References Cited

U.S. PATENT DOCUMENTS 6,047,133 A 4/2000 Washisu et al. ............... 396/55
6,097,896 A * 8/2000 Usui ............................ 396/55
6,734,902 B1 5/2004 Kawahara ................. 348/208.8
6,810,207 B2 * 10/2004 Sato et al. .................... 396/54
7,489,861 B2 * 2/2009 Momochi et al. ............. 396/52

FOREIGN PATENT DOCUMENTS

| JP | 60-166910 | 8/1985 |
| JP | 63-083621 | 4/1988 |
| JP | 64-086766 | 3/1989 |
| JP | 02-154214 A | 6/1990 |
| JP | 07-199259 A | 8/1995 |
| JP | 07-218967 A | 8/1995 |
| JP | 09-046574 A | 2/1997 |
| JP | 11-177879 A | 7/1999 |

* cited by examiner

Primary Examiner—Melissa J Koval
(74) Attorney, Agent, or Firm—Canon U.S.A., Inc. I.P. Division

(57) ABSTRACT

An optical apparatus detects the moving velocity of a main object on an imaging plane and computes the moving velocity of the main object on the basis of the difference between the detected moving velocity on the imaging plane and the velocity of a panning shot captured by a user. During exposure, the optical apparatus detects the difference between the computed moving velocity of the main object and the panning-shot velocity, that is, an error of the panning-shot velocity, and decenters the optical axis of an imaging lens so as to correct the error, thereby enabling the user to capture a satisfactory panning shot.

7 Claims, 9 Drawing Sheets

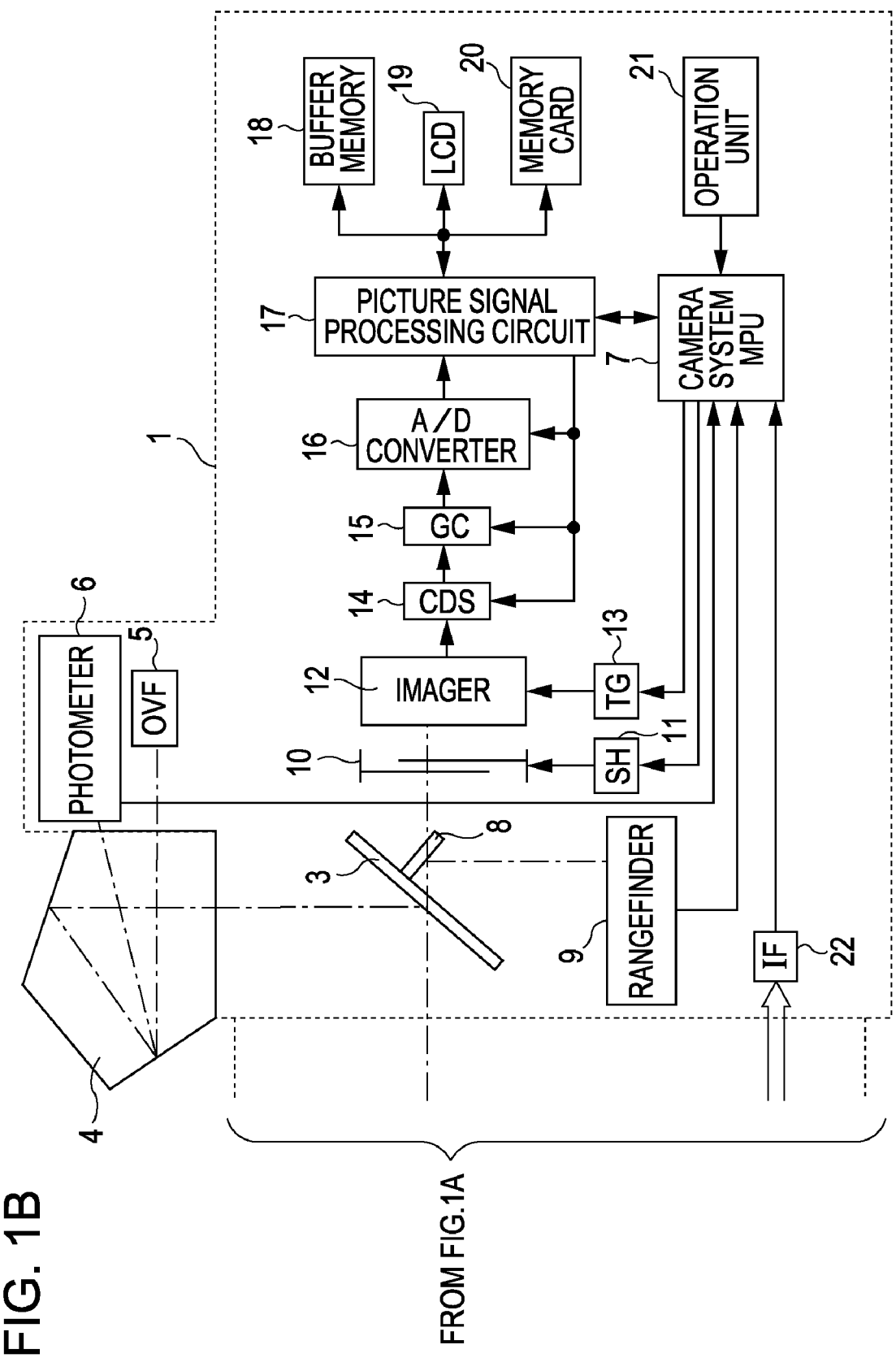

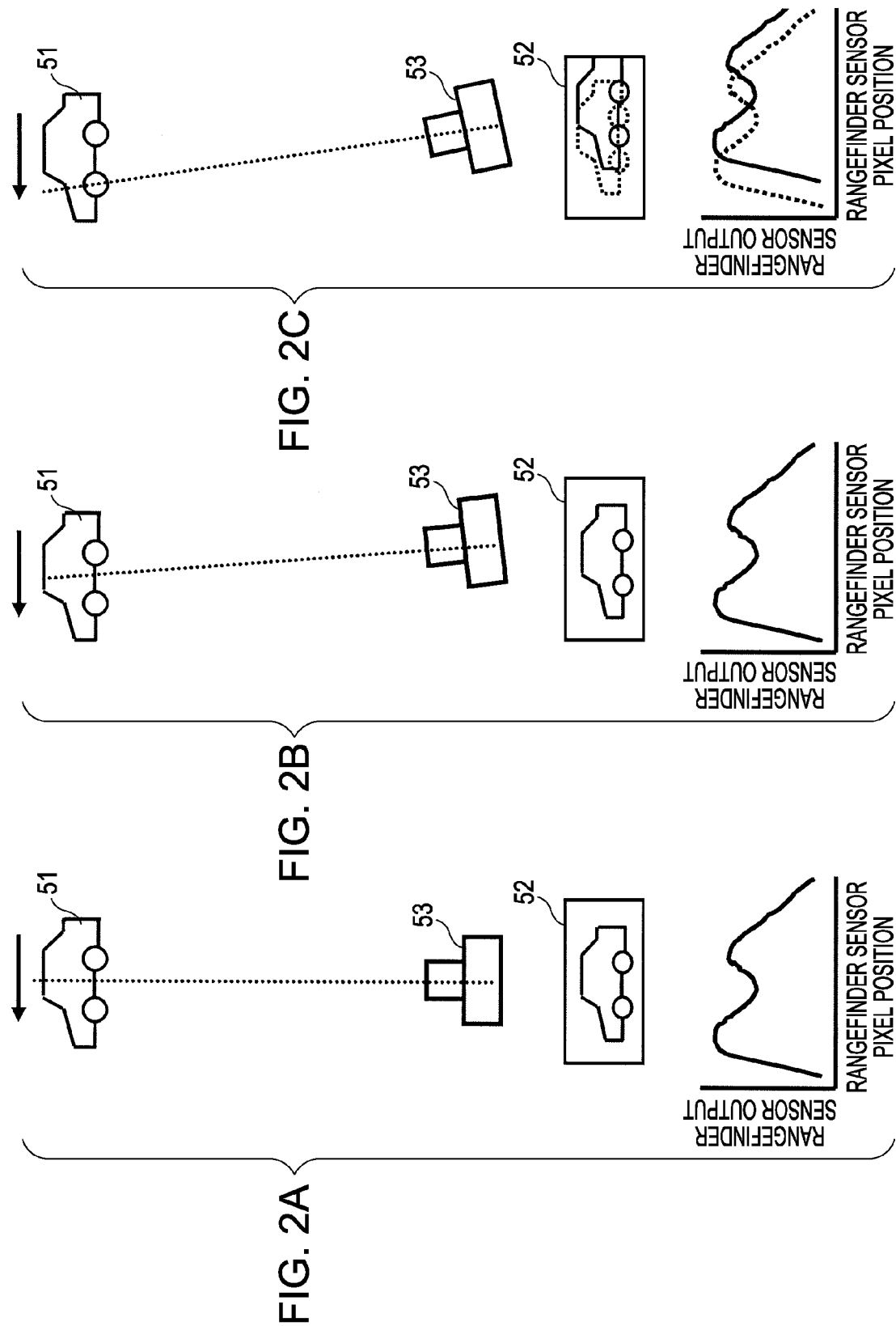

IMAGING APPARATUS

BACKGROUND OF THE INVENTION

1. Field of the Invention

The present invention relates to an optical apparatus, such as a digital video camera, a video camera, or a lens, provided with a function of correcting an image shake caused by hand motion, and more particularly, to an optical apparatus that facilitates effective panning shots.

2. Description of the Related Art

Many currently available cameras are automated to perform most important operations involved in capturing images, such as exposure determination and focusing. Therefore, even beginners are less likely to fail in capturing an image.

Nowadays, apparatuses provided with a function for correcting an image shake caused by hand motion are one of the aforementioned automated operations available in cameras. As a result, the user rarely fails in capturing a satisfactory image.

An anti-shake system will be briefly described. Hand motion in capturing an image with a camera is normally a vibration with a frequency of about 1 to 10 Hz. In many methods, image blur due to the above-described frequency is prevented by detecting a camera shake caused by hand motion using an angular velocity sensor or the like and displacing a correction lens along a plane perpendicular to an optical axis in accordance with the detection result. This is the optical anti-shake shifting system (for example, see Japanese Patent Laid-Open No. 7-218967).

One mode of image capturing with a camera is a panning shot. This is an image capturing technique whereby the camera follows, for example, a main object moving in the horizontal direction. Generally, the shutter speed is reduced to enhance the vividness of the motion of the main object. Typically, the panning shot technique requires an experienced photographer with good skills to accurately track the motion of the object with the camera. That is to say, it is difficult for beginners to capture a panning shot.

In contrast, there is disclosed a camera that can automatically take a panning shot while remaining still. The speed and distance data of a main object are input in advance to the camera, and, in the panning shot mode, the camera remains still on standby. When the main object appears on the screen, the camera remains still, and only a camera-shake correction optical system of the camera moves automatically and horizontally, thereby tracking the main object and taking a panning shot of the main object in accordance with the input speed and distance (for example, see Japanese Patent Laid-Open No. 2-154214).

With respect to video shooting, there is disclosed a function of tracking the moving direction of an object and maintaining the size of the object in captured images constant (for example, see Japanese Patent Laid-Open No. 64-86766). Changes in the moving direction and the size of the object in the captured images are detected from a plurality of video signals generated at different times. For the moving direction, a shake correction lens is driven. And, for the size, a zoom lens is driven, so that there will be no change in the moving direction and the size. Accordingly, the camera can track the moving direction of the object while maintaining the size of the object in the captured images constant.

A satisfactory panning shot is a picture where the main object remains still while the background is flowing in the direction of movement of the main object. A condition for taking such a satisfactory panning shot is that it is necessary to capture an image while the camera tracks the motion of the main object. If an image of the main object can be observed in a viewfinder or the like, it is easy to some degree to track the motion of the main object with the camera. However, in the case of, for example, a single-lens reflex, a quick return mirror is lifted in exposure, and it thus becomes impossible to observe an image of the object. Therefore, it is difficult to track the motion of the main object with the camera during exposure.

In the above-described Japanese Patent Laid-Open No. 2-154214, it is necessary to input in advance the speed and distance data of the main object. Every time the moving speed of the main object changes, new data must be input. In the actual image capturing, the main object does not necessarily move according to the input speed data. If the data does not coincide with the speed of the object, a satisfactory panning shot cannot be captured.

Since the above-described Japanese Patent Laid-Open No. 64-86766 assumes video shooting, a plurality of video signals generated at different times can be obtained, and changes in the movement direction of the object in the images can be detected on the basis of the obtained plurality of video signals.

However, when this is applied to capturing a still image, it is difficult to use the method described in Japanese Patent Laid-Open No. 64-86766 since an image pickup device merely accumulates imaging signals during exposure. That is, it is difficult to detect the amount of movement in an object image during exposure.

Therefore, it would be desirable to provide an optical apparatus, such as a camera, a camera system, or a lens, which is capable of detecting the moving velocity of a main object and of which further is capable of capturing a satisfactory panning shot of the main object.

SUMMARY OF THE INVENTION

The present invention provides an optical apparatus, such as a camera, a camera system, or a lens, which can detect the moving velocity of a main object and to capture a satisfactory panning shot of the main object.

According to an aspect of the present invention, there is provided an optical apparatus including a first shake detection unit configured to detect a shake applied to the optical apparatus; an object image detection unit configured to detect an image of an object on the basis of light passing through an imaging lens; a second shake detection unit configured to detect a shake in the image of the object on the basis of an object image signal from the object image detection unit; an optical axis decentering unit configured to decenter the optical axis of the imaging lens; an optical axis decentering control unit configured to control driving of the optical axis decentering unit; and a computing unit configured to compute the moving velocity of the object on the basis of a detection result obtained by the first shake detection unit and a detection result obtained by the second shake detection unit, wherein the optical axis decentering control unit causes the optical axis decentering unit to decenter the optical axis of the imaging lens on the basis of the difference between the moving velocity of the object, which is computed by the computing unit, and the detection result obtained by the first shake detection unit.

According to another aspect of the present invention, the computing unit computes the moving velocity of the object on the basis of the detection result obtained during imaging preparation by the first shake detection unit and the detection result obtained during imaging preparation by the second shake detection result, and the optical axis decentering control unit causes the optical axis decentering unit to decenter the optical axis of the imaging lens on the basis of the difference between the computed moving velocity of the object and the detection result obtained during exposure by the first shake detection unit.

According to yet another aspect of the present invention, the computing unit computes a panning-shot velocity on the basis of focal length information of the imaging lens and measured object distance information, and computes the difference between the detection result obtained by the first shake detection unit and the panning-shot velocity, and the optical axis decentering control unit causes the optical axis decentering unit to decenter the optical axis of the imaging lens on the basis of the computed difference.

According to yet another aspect of the present invention, the computing unit computes the moving velocity of the object on the basis of the detection result obtained during imaging preparation by the first shake detection unit and the detection result obtained during imaging preparation by the second shake detection unit; while during imaging preparation, the computing unit computes a panning-shot velocity on the basis of the moving velocity of the object, which is computed by the computing unit, focal length information of the imaging lens, and measured object distance information; while during exposure, the computing unit computes the difference between the computed panning-shot velocity and the detection result obtained during exposure by the first shake detection unit; and the optical axis decentering control unit causes the optical axis decentering unit to decenter the optical axis of the imaging lens on the basis of the computed difference.

Moreover, according to still yet another aspect of the present invention the first shake detection unit may be a rotational shake detection unit. Also, according to another aspect of the present invention, the object image detection unit may be a focus detection unit configured to detect a focus state of the image of the object on the basis of the light passing through the imaging lens. Furthermore, according to another aspect of the present invention, the object image detection unit may be an imaging unit configured to capture the image of the object on the basis of the light passing through the imaging lens.

Additionally, according to yet another aspect of the present invention, a camera system is provided which includes a camera body and an interchangeable lens assembly attachable to the camera body. The camera system further includes a first shake detection unit configured to detect a shake applied to the optical apparatus; an object image detection unit configured to detect an image of an object on the basis of light passing through an imaging lens; a second shake detection unit configured to detect a shake in the image of the object on the basis of an object image signal from the object image detection unit; an optical axis decentering unit configured to decenter the optical axis of the imaging lens; an optical axis decentering control unit configured to control driving of the optical axis decentering unit; and a computing unit configured to compute the moving velocity of the object on the basis of a detection result obtained by the first shake detection unit and a detection result obtained by the second shake detection unit, wherein the optical axis decentering control unit causes the optical axis decentering unit to decenter the optical axis of the imaging lens on the basis of the difference between the moving velocity of the object, which is computed by the computing unit, and the detection result obtained by the first shake detection unit.

According to the aspect of the present invention, the moving velocity of the object is computed during imaging preparation. A desired panning-shot velocity is computed in advance on the basis of the moving velocity of the object, focal length information of the imaging lens, and object distance information, and, during exposure, the difference between the computed panning-shot velocity and the actual panning-shot velocity detected by the first shake detector is preferably corrected by the optical axis decentering unit. The focal length of the imaging lens is, for example, the zoom position of a zoom lens. The object distance information is distance information obtained with a rangefinder or the like.

According to the aspect of the present invention, the moving velocity of a main object on an imaging plane is detected, and the moving velocity of the main object is computed on the basis of the difference between the detected moving velocity and the velocity of a panning shot actually captured by a user. During exposure, the difference between the computed moving velocity of the main object and the panning-shot velocity, that is, an error of the panning-shot velocity, is detected, and a lens is moved so as to correct the error. Accordingly, the user can capture a satisfactory panning shot.

Further features of the present invention will become apparent from the following description of an exemplary embodiment with reference to the attached drawings.

BRIEF DESCRIPTION OF THE DRAWINGS

FIGS. 1A and 1B are block diagrams of an exemplary configuration of a camera system according to an aspect of the present invention.

FIGS. 2A to 2C are diagrams showing exemplary imaging situations, viewfinder images, and rangefinder-sensor output signals in capturing panning shots.

DESCRIPTION OF THE EMBODIMENT

Embodiments, features and aspects of the present invention will now herein be described in detail with reference to the accompanying drawings.

Figures 1, 1A:
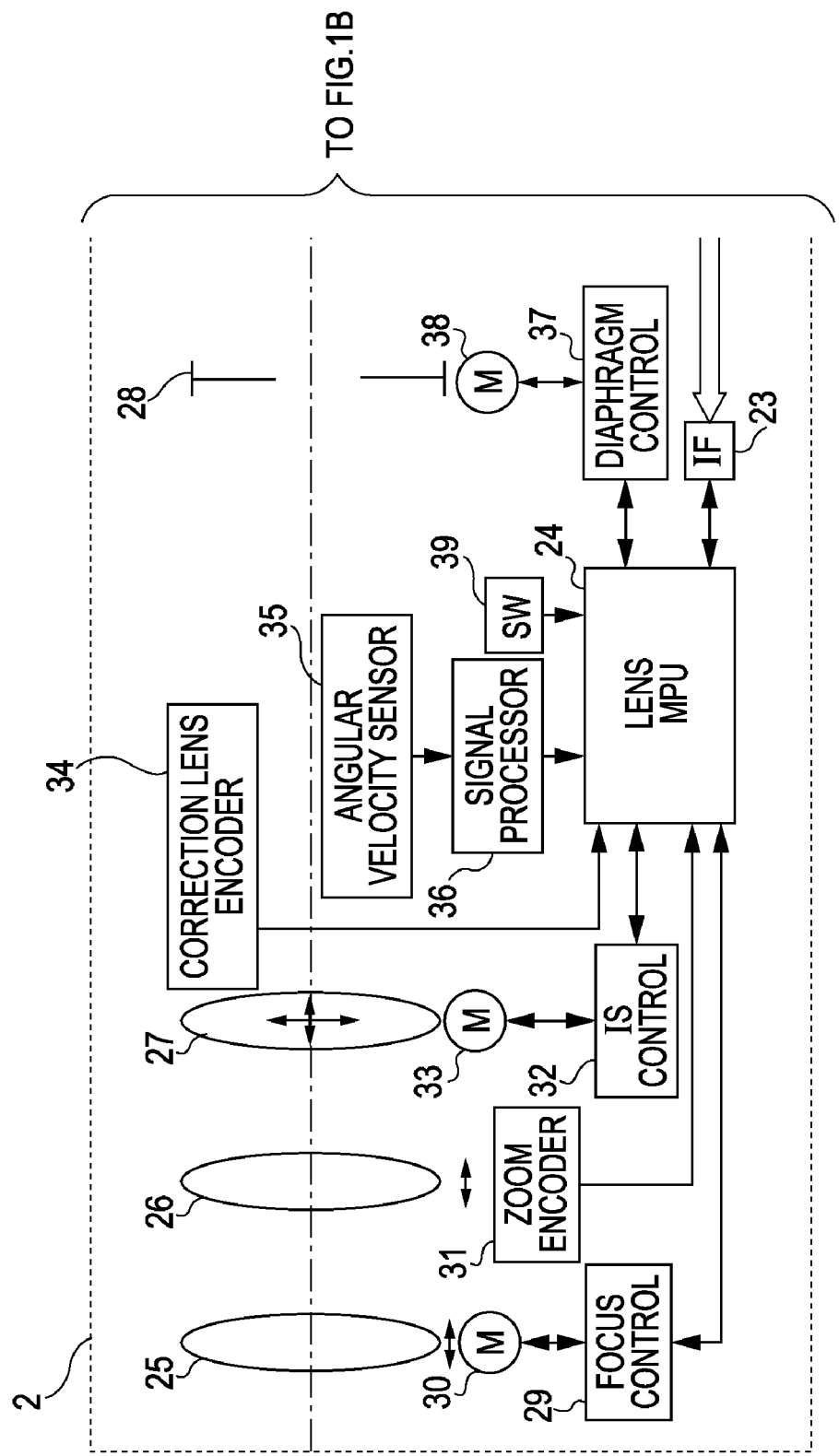

FIGS. 1A and 1B show the configuration of a camera system including a camera body 1 and an interchangeable lens assembly 2.

An imaging light beam from an object passes through an imaging optical system of the interchangeable lens assembly 2. Thereafter, during imaging preparation, the light beam is partially reflected by a quick-return main mirror 3 whose central portion serves as a half mirror to generate an erect image at a pentaprism 4. A user of the camera system can check the erect image as an image of the object using an optical viewfinder 5.

A photometric circuit 6 measures the luminance on the surface of a focusing plate (not shown) and inputs the measurement result to a camera system control microprocessing unit (MPU) 7. The camera system control MPU 7 determines imaging conditions, such as the exposure time or focusing. A photometric sensor in the photometric circuit 6 is divided into a plurality of areas, and the measurement result according to each area can be obtained.

A submirror 8 is located on the back surface of the quick-return main mirror 3 and allows the light beam that has passed through the half mirror surface of the quick-return main mirror 3 to enter a rangefinder 9. The rangefinder 9 generates distance data by performing photoelectric conversion and signal processing of the entering light beam and inputs the distance data to the camera system control MPU 7.

Upon entering the imaging operation, the quick-return main mirror 3 and the submirror 8 retract to the pentaprism 4. Thereafter, a focal plane shutter 10 is driven by a shutter drive circuit 11, and an imaging light beam is focused as an imaging optical image on an imager (such as a charge-coupled device (CCD) or a complementary mental-oxide semiconductor (CMOS) device) 12. The imaging optical image is photoelectric-converted by the imager 12 into an imaging signal.

A timing generator 13 controls the accumulation, reading, and resetting operations of the imager 12. A correlated double sampling (CDS) circuit 14 reduces accumulated charge noise of the imager 12. A gain control circuit 15 amplifies the imaging signal. An analog-to-digital (A/D) converter 16 converts the amplified analog imaging signal into digital image data.

A picture signal processing circuit 17 performs filtering, color conversion, and gamma correction of the digital image data from the A/D converter 16. An image signal generated by the picture signal processing circuit 17 is stored in a buffer memory 18. The stored image signal is used to display an image on a liquid crystal display (LCD) 19 or to be recorded on a removable memory card 20.

An operation unit 21 includes a group of switches for setting the imaging mode of the camera or the file size of a recorded image or for releasing the shutter to capture an image.

The camera system control MPU 7 controls the above-described operation of the camera body 1. Further, the camera system control MPU 7 communicates with a lens MPU 24 via an interface circuit 22 of the camera body 1 and an interface circuit 23 of the interchangeable lens assembly 2. With the communication, the camera body 1 transmits a focus drive command to the interchangeable lens assembly 2, or the camera body 1 and the interchangeable lens assembly 2 exchange data including the internal operation status or optical information of the camera body 1 and the interchangeable lens assembly 2.

The interchangeable lens assembly 2 includes, as part of the imaging optical system, a focus lens 25, a zoom lens 26, an image-shake correction lens 27, and a diaphragm 28.

The focus lens 25 is driven by a control signal from the lens MPU 24 via a focus control circuit 29 and a focus lens drive motor 30. The focus control circuit 29 includes, besides a focus lens drive circuit, an additional focus encoder that outputs a zone pattern signal or a pulse signal in accordance with the movement of the focus lens 25. The distance of an object can be detected with the focus encoder.

The zoom lens 26 moves in response to the user's operation of a zoom operation ring (not shown). A zoom encoder 31 outputs a zone pattern signal in accordance with the movement of the zoom lens 26. The imaging magnification can be obtained by the lens MPU 24 reading signals from the focus encoder and the zoom encoder 31 and reading preliminary-stored imaging magnification data on the basis of a combination of the distance and the focal length of the object.

The image-shake correction lens 27 is driven via an image-shake correction control circuit 32 and a linear motor 33. Image-shake correction is performed as follows. That is, a shake signal from an angular velocity sensor 35 that detects a rotational shake is processed by a signal processing circuit 36, and the processed signal is input to the lens MPU 24. The lens MPU 24 computes a correction lens drive target signal and outputs a drive signal in accordance with the difference between the correction lens drive target signal and a correction lens position signal output from a correction lens encoder 34 to the image-shake correction control circuit 32. The image-shake correction is performed in this manner by feeding back the correction lens position signal output from the correction lens encoder 34 to the image-shake correction control circuit 32.

The diaphragm 28 is driven by a control signal from the lens MPU 24 via a diaphragm control circuit 37 and a stepping motor 38.

A switch 39 is a switch for turning on and off the image-shake correction function and for selecting the image-shake correction operation mode. The selectable image-shake correction modes include the normal image-shake correction operation mode and the panning-shot operation mode.

Known techniques for detecting the amount of an object shake using the rangefinder 9 of the camera are disclosed in, for example, Japanese Patent Laid-Open Nos. 60-166910 and 63-83621.

This method of detecting the amount of an object shake using the rangefinder 9 of the camera will be described briefly. Firstly, an image of an object is detected, and image data is stored. After a predetermined period of time, new image data of the same object is captured again, and this image data is compared with the previously-stored image data. If there is no object shake, the two pieces of image data (images of the object) coincide with each other. However, if there is a shake, the amount of the object shake can be detected from the amount of shift.

FIGS. 2A to 2C show exemplary panning shots of an object and the outputs of a rangefinder sensor. An automobile 51 serving as a main object moves at a constant velocity from right to left on the page. A user 53 of the camera takes a panning shot so that the main object is positioned at the center of an imaging screen 52. Referring to FIGS. 2A to 2C, figures in the upper row show the imaging situations, figures in the middle row show images of the object, and figures in the lower row show the outputs of the rangefinder sensor (line sensor with a plurality of pixels).

FIG. 2A shows the imaging situation at a certain time. FIG. 2B shows the imaging situation after a predetermined period of time has passed since the time of FIG. 2A. In the figures in the middle row of FIGS. 2A and 2B, the automobile 51 serving as the main object is at the same central position on the imaging screen 52. Similarly, the outputs of the rangefinder sensor (figures in the lower row of FIGS. 2A and 2B) are the same. In this case, the velocity of the panning shot taken by the user 53 and the moving velocity of the object coincide with each other, and a satisfactory panning shot is thereby captured.

However, when the velocity of the panning shot taken by the user 53 does not coincide with the moving velocity of the object, as shown in FIG. 2C, the automobile 51 serving as the main object is shifted from the center of the imaging screen 52. Similarly, the output of the rangefinder sensor is also shifted from that of FIG. 2A. It is assumed that the timing of FIG. 2C with respect to FIG. 2A is the same as that of FIG. 2B. Referring to FIG. 2C, dotted lines correspond to the image of the object in FIG. 2A, and the difference between the dotted lines and the solid lines corresponds to the shift.

Figure 3A:
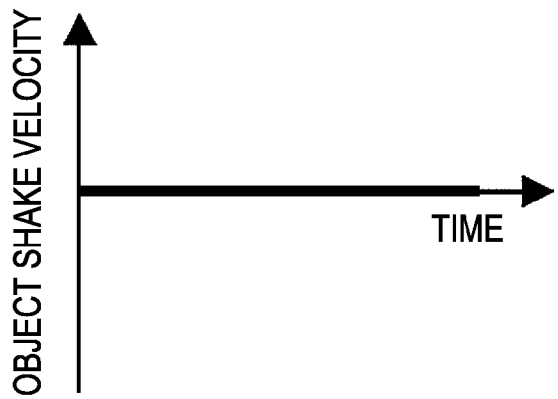
FIGS. 3A and 3B are diagrams showing changes in the time domain of the object shake velocity and the output of an angular velocity sensor in the case of a satisfactory panning shot captured with the system shown in FIGS. 1A and 1B.
Figure 3B:
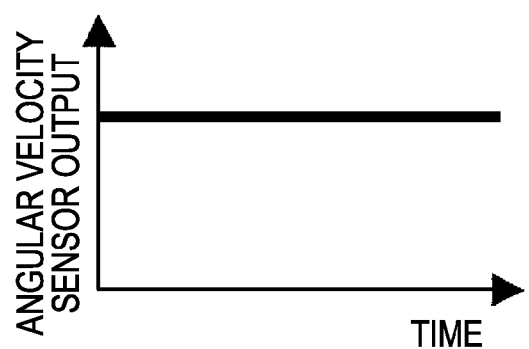

FIGS. 3A and 3B show changes in the time domain of the object shake velocity obtained with the rangefinder sensor and the output of the angular velocity sensor in the case of a satisfactory panning shot. In the case of a satisfactory panning shot, the object shake velocity obtained with the rangefinder sensor is substantially zero. Since the panning shot is taken at the same angular velocity as that of the object moving at a constant velocity, the output of the angular velocity sensor is a substantially constant angular velocity signal.

Figure 4A:
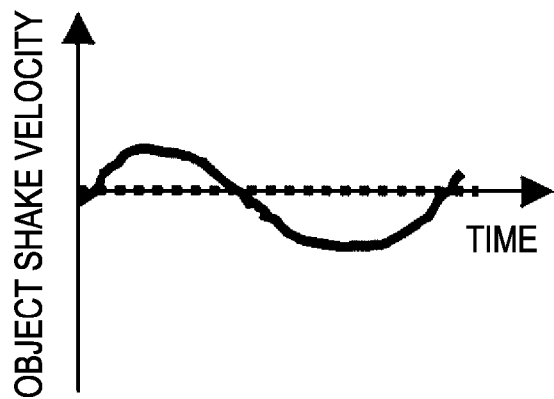
FIGS. 4A and 4B are diagrams showing changes in the time domain of the object shake velocity and the output of the angular velocity sensor in the case of an unsatisfactory panning shot, serving as a comparative example of the present invention.
Figure 4B:
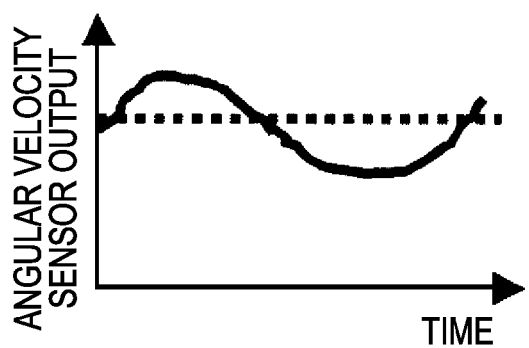

In contrast, FIGS. 4A and 4B show changes in the time domain of the object shake velocity and the output of the angular velocity sensor in the case of an unsatisfactory panning shot. In the case of an unsatisfactory panning shot, the object shakes horizontally on the rangefinder sensor. As a result, the object shake velocity fluctuates, as indicated by the solid line in FIG. 4A. At the same time, the output of the angular velocity sensor fluctuates, as indicated by the solid line in FIG. 4B, since the panning shot is taken at an angular velocity different from that of the object moving at a constant velocity.

Figure 5:
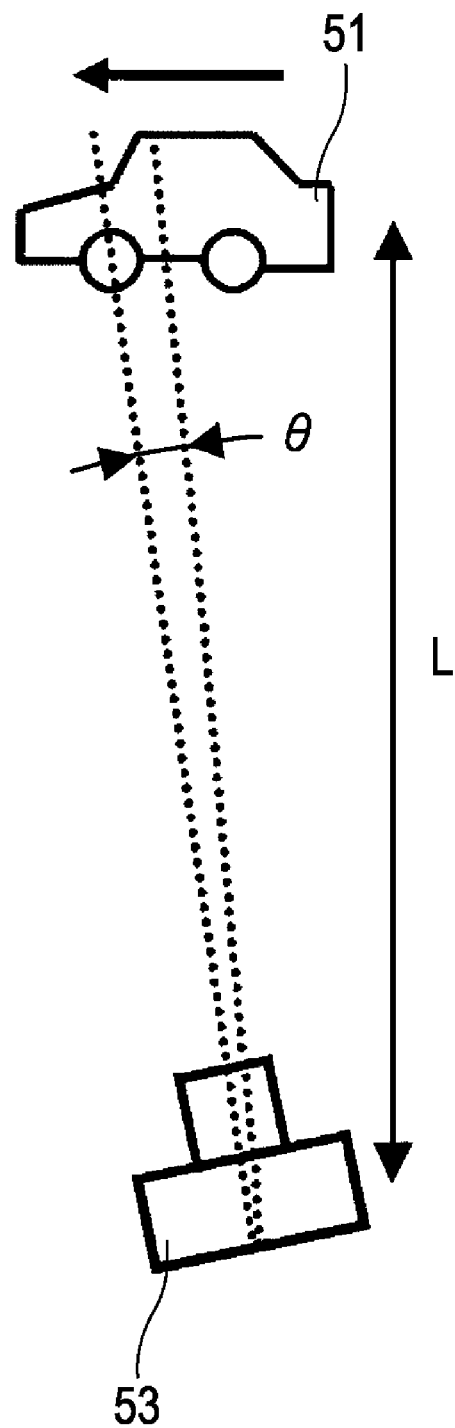
FIG. 5 is a diagram showing an exemplary imaging situation in capturing a panning shot with the system shown in FIGS. 1A and 1B.

There is a correlation between a change in the object shake velocity and a change in the output of the angular velocity sensor. As shown in FIG. 5, the following relational expression holds:

$$D_a = \beta L \pi \theta_a / 180 \quad (1)$$

where $\theta_a$ [deg] is the angular displacement of the change, L is the distance of the object, $\beta$ is the imaging magnification, and $D_a$ is the displacement of the object shake.

Therefore, the following relational expression holds:

$$V_a = \beta L \pi \omega_a / 180 \quad (2)$$

where $V_a$ is the object shake velocity, and $\omega_a$ is the angular velocity of the change.

By subtracting the change angular velocity $\omega_a$ from the actually detected angular velocity sensor output $\omega$, the angular velocity $\omega_0$ for taking a satisfactory panning shot, that is, for accurately tracking the moving object, is computed:

$$\omega_0 = \omega - \omega_a = \omega - 180 V_a / (\beta L \pi) \quad (3)$$

When the camera enters the exposure sequence and the mirrors are lifted, $V_a$ in equation (3) cannot be obtained. However, the change angular velocity $\omega_a$ is computable by subtracting the tracking angular velocity $\omega_0$ from the actually detected angular velocity sensor output $\omega$. Therefore, the driving of the image-shake correction lens 27 so as to cancel out the object shake of the change angular velocity $\omega_a$ eliminates the object shake in a panning shot. As a result, a satisfactory panning shot can be captured.

The above operation will be described with reference to the flowcharts of FIGS. 6 to 9.

Figure 6:
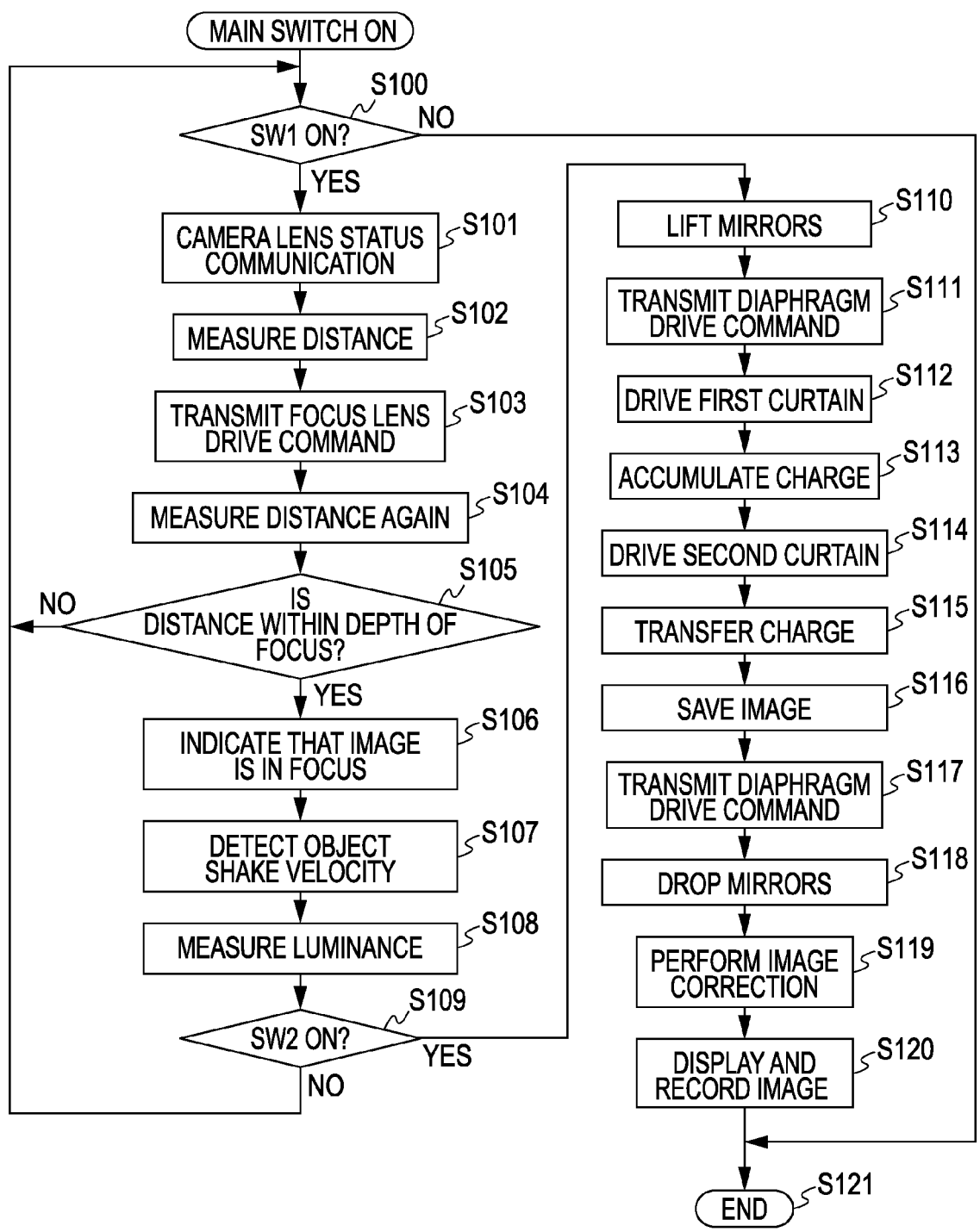
FIG. 6 is a flowchart of an exemplary operation of a camera body of the system shown in FIGS. 1A and 1B.

With reference to the flowchart of FIG. 6, an exemplary imaging operation of the camera body (hereinafter may also be simply referred to as the "camera") 1 will be described.

When the main switch of the camera body 1 is turned on, the camera system control MPU 7 starts the operation from step S100. In step S100, it is determined whether a release switch of the operation unit 21 of the camera body 1 is pressed halfway (SW1 ON). If the release switch is pressed halfway (YES in step S100), the flow proceeds to step S101. If the release switch is not pressed halfway (NO in step S100), the flow proceeds to step S121, and the processing ends.

In step S101, the camera body 1 performs camera-lens status communication with the lens MPU 24 of the interchangeable lens assembly (hereinafter may also be simply referred to as the "lens") 2 via the interface circuits 22 and 23. The camera 1 transmits the status of the camera 1 (e.g., the status of the release switch (SW1 ON), the imaging mode, the shutter speed, etc.) to the lens 2 and receives the status of the lens 2 (e.g., the focal length, the diaphragm status, the drive status of the focus lens 25, etc.). Although the camera-lens-status communication is described only at a major point in the flowcharts of the embodiment of the present invention, the camera-lens-status communication is performed as needed, such as when the status of the camera 1 changes or when the camera 1 wants to check the status of the lens 2.

Since the release switch is pressed halfway (SW1 ON), in step S102, the rangefinder 9 measures the distance and computes the focus-lens drive amount in order to focus on an object. In step S103, the focus-lens drive amount is transmitted to the interchangeable lens assembly 2. This data is transmitted as, for example, the target number of pulses for driving the focus encoder.

When the driving of the focus lens 25 ends, in step S104, the distance of the object is measured again. In step S105, it is determined whether the distance is within the depth of focus. If the distance is within the depth of focus (YES in step S105), the flow proceeds to step S106. Since the distance is within the depth of focus, in step S106, it is indicated that the image is in focus. This is performed by turning on a light-emitting diode (LED) in the optical viewfinder 5 of the camera body 1 or by generating a sound.

In step S107, the object shake velocity is detected from a signal from the rangefinder 9 using the above-described method. The detected object-shake-velocity data is transmitted to the interchangeable lens assembly 2. In step S108, the photometric result (luminance) from the photometric circuit 6 is obtained, and the exposure time Tv and the aperture (diaphragm drive amount) are computed.

In step S109, it is determined whether the release switch of the operation unit 21 of the camera body 1 is pressed all the way down (SW2 ON). If the release switch is pressed all the way down (YES in step S109), the flow proceeds to step S110. In step S110, the quick-return main mirror 3 is lifted. At the same time, the submirror 8 is driven, together with the quick-return main mirror 3, relative to the pentaprism 4. An image of the object entering the rangefinder 9 at this point is blocked.

In step S111, the diaphragm drive amount computed in step S108 is transmitted to the interchangeable lens assembly 2, and the diaphragm 28 is driven. In step S112, a first curtain is driven. In step S113, an image of the object is exposed onto the imager 12, and charge is accumulated. In step S114, after the exposure time has passed, a second curtain is driven, and the exposure is terminated.

In step S115, charge transfer (readout) from the imager 12 is performed. In step S116, the readout captured image signal is subjected to the CDS circuit 14, the gain control circuit 15, and the A/D converter 16 and is converted into digital data (image data), and the digital data is stored in the buffer memory 18.

In step 117, a diaphragm open command is transmitted to the interchangeable lens assembly 2, and the diaphragm 28 is opened again. In step S118, the quick-return main mirror 3 and the submirror 8 are dropped. In step S119, image correction such as gamma correction and compression is performed. In step S120, the corrected image data is displayed on the LCD 19 and is recorded on the memory card 20. Then in S121 the imaging operation ends.

On the other hand, if in S105 the distance is not within depth of focus, or in S109 the release switch (SW2) of the operation unit 21 of the camera body 1 is not pressed all the way down, the process returns to step S100.

Figure 7:
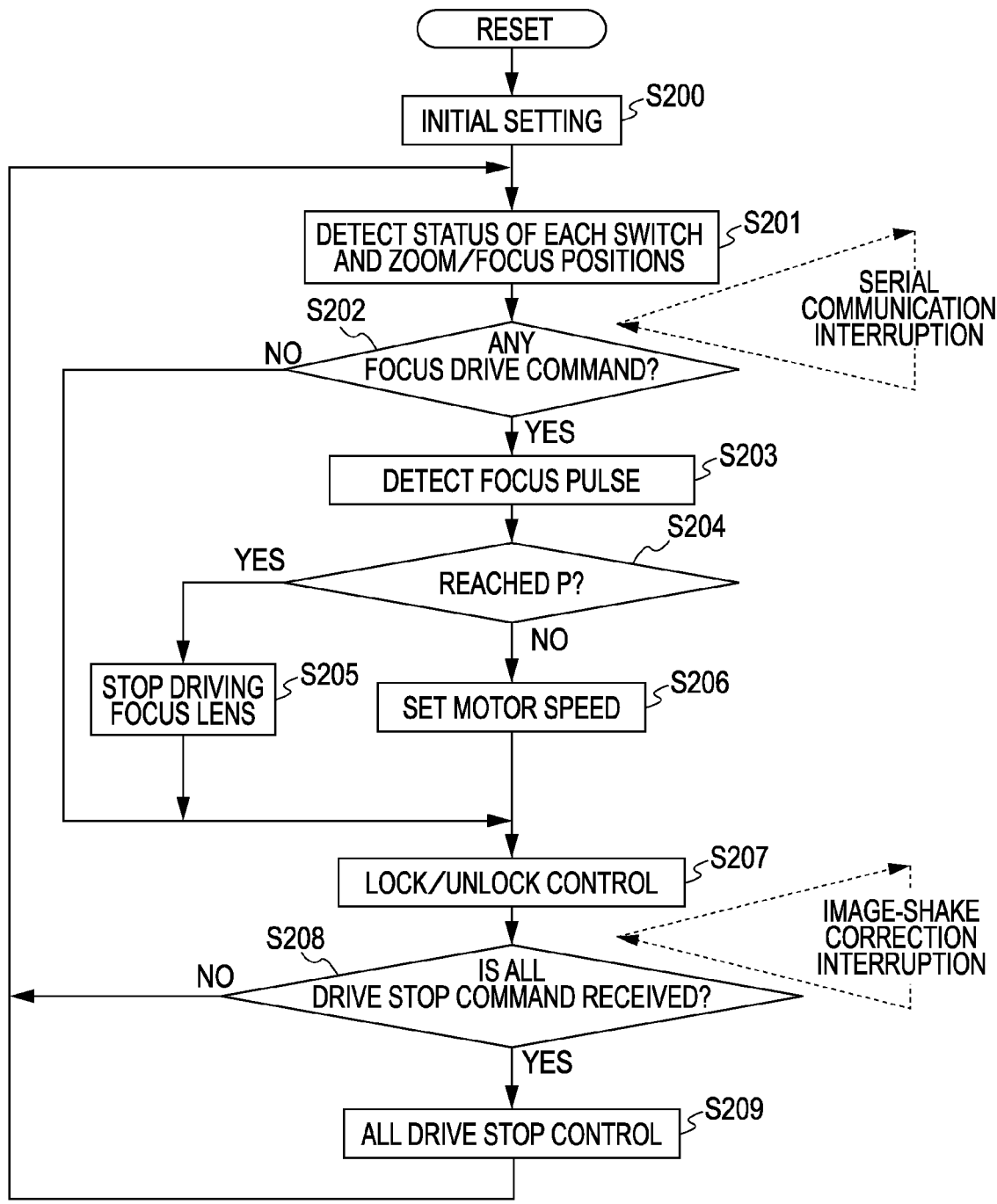
FIG. 7 is a flowchart of an exemplary operation of an interchangeable lens assembly of the system shown in FIGS. 1A and 1B.
Figure 8:
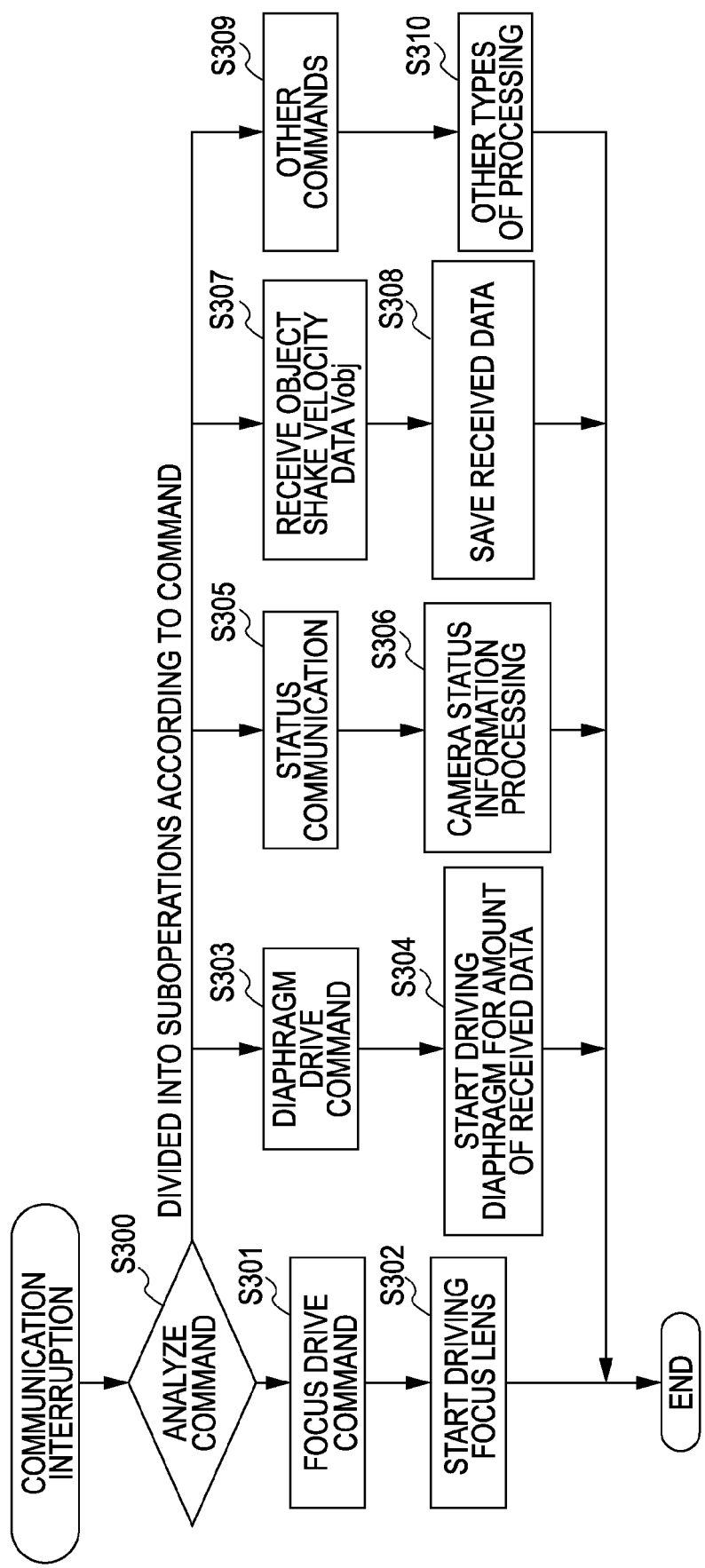
FIG. 8 is a flowchart of an exemplary operation of the interchangeable lens assembly of the system shown in FIGS. 1A and 1B.
Figure 9:
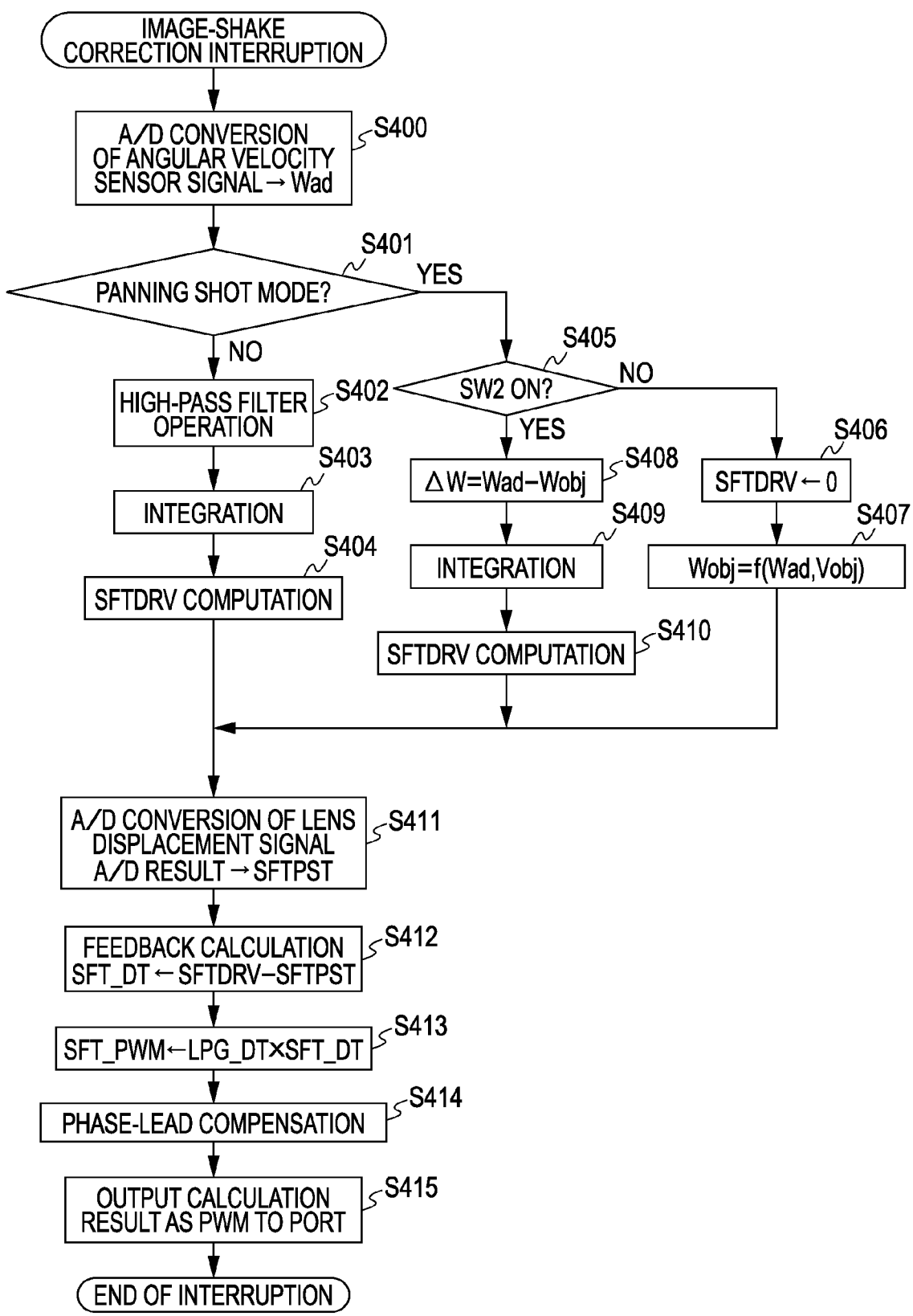
FIG. 9 is a flowchart of the exemplary image-shake correction operation of the system shown in FIGS. 1A and 1B.

With reference to the flowcharts of FIGS. 7 to 9, an exemplary operation of the interchangeable lens assembly 2 will be described.

When the interchangeable lens assembly 2 is attached to the camera body 1 or the main switch of the camera body 1 is turned on, the camera body 1 starts serial communication with the interchangeable lens assembly 2. The lens MPU 24 starts the operation from step S200 of FIG. 7.

In step S200, the lens MPU 24 sets the initial setting for the lens control and the image-shake correction control. In step S201, the lens MPU 24 detects the status of switches (not shown) and the zoom/focus positions. The switches include, for example, a switch for switching between autofocus and manual focus and an on/off switch for switching on and off the image-shake correction function. In step S202, the lens MPU 24 determines whether a focus drive command is communicated from the camera 1. If the focus drive command is received (YES in step S202), the flow proceeds to step S203. If the command is not received (NO in step S202), the flow proceeds to step S207.

In step S203, since the focus drive command communicated from the camera 1 includes the target amount (the number of pulses) for driving the focus lens 25, the lens MPU 24 detects the number of pulses of the focus encoder of the focus control circuit 29 and controls the focus driving so that the target number of pulses is driven.

In step S204, the lens MPU 24 determines whether the target number of pulses P has been reached. If the target has been reached (YES in step S204), the flow proceeds to step S205. If the target has not been reached (NO in step S204), the flow proceeds to step S206. In step S205, since the target number of pulses has been reached, the driving of the focus lens 25 is stopped. In step S206, since the target number of pulses has not been reached, the lens MPU 24 sets the speed of the focus lens drive motor 30 according to the number of pulses remaining to be driven. The fewer the number of pulses remaining to be driven, the lower the speed becomes.

In step S207, if the switching off of the image-shake correction function on/off switch is detected in step S201, the lens MPU 24 locks the image-shake correction lens 27 with respect to the optical axis. If the switching on of the image-shake correction function on/off switch is detected in step S201, and if, in the camera-lens-status communication, the release switch of the camera 1 is detected to be pressed halfway (SW1 ON), the lens MPU 24 unlocks the image-shake correction lens 27, thereby becoming ready to perform the image-shake correction operation.

In step S208, the lens MPU 24 determines whether an all drive stop command (to stop driving all the actuators in the lens assembly 2) is received from the camera 1. If the all drive stop command is not received from the camera 1, the flow returns to step S201. If the all drive stop command is received from the camera 1, the flow proceeds to step S209. For example, the all drive stop command is transmitted from the camera 1 when operation is not performed on the camera 1 side for a while. In step S209, the lens MPU 24 performs the all drive stop control. The lens MPU 24 stops driving all the actuators and enters a sleep (stop) mode. The power supply to an image-shake correction device is stopped. Thereafter, when an operation is performed on the camera 1 side, the camera 1 communicates with the lens 2 to disable the sleep mode.

When a serial communication interruption or an image-shake correction control interruption is requested during the above-described operation, the interruption processing is performed.

In the case of the serial communication interruption, communicated data is decoded, and, according to the decoding result, the lens operation is performed, such as the driving of the diaphragm 28 or the focus lens 25. By decoding the communicated data, it is also possible to determine whether the SW1 or SW2 is turned on or to determine the shutter speed or the camera model.

The image-shake correction interruption is a timer interruption occurring periodically. In the case of the image-shake correction interruption, image-shake correction control is performed in a pitch direction (vertical direction) and in a yaw direction (horizontal direction).

An exemplary serial communication interruption will be described with reference to the flowchart of FIG. 8. In response to communication from the camera 1, the lens 2 starts the operation from step S300. In step S300, the lens 2 analyzes a command from the camera 1, and the operation is divided into suboperations according to the command.

In step S301, since a focus drive command is received, the flow proceeds to step S302. In step S302, the speed of the focus lens drive motor 30 is set according to the target number of pulses to be driven, and the driving of the focus lens 25 starts. Then the process ends.

In step S303, since a diaphragm drive command is received, the flow proceeds to step S304 in order to drive the diaphragm 28 on the basis of the transmitted diaphragm drive data. In step S304, the drive pattern of the stepping motor 38 is set, and the set drive pattern is output to the stepping motor 38 via the diaphragm control circuit 37, thereby driving the diaphragm 28. Then the process ends.

In step S305, since camera-lens-status communication is received, the flow proceeds to step S306. In step S306, the lens 2 transmits lens focal length information or the image-shake-correction operation status to the camera 1 or receives status information (e.g., the status of the release switch, the imaging mode, or the shutter speed) from the camera 1. Then the process ends.

In step S307, since an object-shake-velocity data reception command is received, the flow proceeds to step S308. In step S308, received object-shake-velocity data Vobj is stored in a random access memory (RAM) in the lens MPU 24. Then the process ends.

In step S309, since another command, such as lens focus sensitivity data communication or lens optical data communication is received, the flow proceeds to step S310, and the associated processing is performed. Then the process ends.

Next, the image-shake correction interruption will be described with reference to the flowchart of FIG. 9. When the image-shake correction interruption occurs during the main operation of the lens 2, the lens MPU 24 starts the image-shake correction control from step S400 of FIG. 9.

In step S400, an output signal generated by processing a signal from the angular velocity sensor 35 by the signal processing circuit 36 is A/D converted, and the A/D conversion result is denoted by Wad. In step S401, the lens MPU 24 determines the status of the switch 39, namely, whether the imaging mode is the panning shot mode or the normal anti-shake mode. In the case of the normal anti-shake mode (NO in step S401), the flow proceeds to step S402. In the case of the panning shot mode (YES in step S401), the flow proceeds to step S405.

In step S402, the lens MPU 24 performs high-pass filter operation in order to cut off low frequency components. For a predetermined period of time after the start of the filter operation, the lens MPU 24 changes the time constant of the high-pass filter so that the signal quickly becomes stable. In step S403, the lens MPU 24 integrates the result of the high-pass filter operation to obtain angular displacement data. In step S404, the lens MPU 24 reads the anti-shake sensitivity according to the zoom position and the focus position and computes the target drive amount SFTDRV for driving the image-shake correction lens 27.

In step S405, since the panning shot mode is selected, the lens MPU 24 determines whether the SW2 is on, that is, whether the exposure operation is selected. If SW2 is off (NO in step S405), the flow proceeds to step S406. If SW2 is on (YES in step S405), the flow proceeds to step S408. In step S406, the lens MPU 24 sets the target drive amount SFTDRV for driving the image-shake correction lens 27 to zero in order to electrically maintain the image-shake correction lens 27 at the center.

In step S407, the lens MPU 24 computes the angular velocity Wobj for accurately tracking the moving object on the basis of the angular-velocity-sensor A/D conversion result Wad and the object-shake-velocity data Vobj received from the camera 1. The angular velocity sensor output Wad corresponds to $\omega$, the object-shake-velocity data Vobj corresponds to Va, and the angular velocity Wobj corresponds to $\omega_0$ in equation (3).

In step S408, since the SW2 is on, that is, since the user has selected the exposure operation, the lens MPU 24 computes the change angular velocity $\Delta W$. The change angular velocity $\Delta W$ corresponds to $\omega_a$ in equation (3). In step S409, the lens MPU 24 integrates the change angular velocity $\Delta W$ to obtain the change angular displacement data.

In step S410, the lens MPU 24 reads the anti-shake sensitivity in accordance with the zoom position and the focus position and computes the target drive amount SFTDRV for driving the image-shake correction lens 27. By driving the image-shake correction lens 27 in accordance with the target drive amount SFTDRV computed from the change angular velocity $\Delta W$, the lens 2 operates so as to cancel out the image shake. As a result, there will be no object shake in a panning shot, and a satisfactory panning shot can be captured.

In step S411, a signal from the correction lens encoder 34 for detecting the amount of decentering the image-shake correction lens 27 is A/D-converted, and the A/D conversion result is stored in a RAM area set by SFTPST in the lens MPU 24. In step S412, the lens MPU 24 performs a feedback calculation (SFTDRV-SFTPST), and the calculation result is stored in a RAM area set by SFT_DT in the lens MPU 24.

In step S413, the loop gain LPG_DT is multiplied by the calculation result SFT_DT in step S412, and the product is stored in a RAM area set by SFT_PWM in the lens MPU 24. In step S414, the lens MPU 24 performs a phase compensation calculation for stabilizing the control system. In step S415, the calculation result in step S414 is output as PWM to a port of the lens MPU 24, and the image-shake correction interruption ends. The output of the lens MPU 24 is input to a driver circuit in the image-shake correction control circuit 32, and the image-shake correction lens 27 is driven by the linear motor 33, thereby performing the image-shake correction.

As has been described above, when the panning shot mode is selected, the camera system control MPU 7 transmits object shake information, which is obtained from the rangefinder 9 of the camera body 1 during the aiming prior to the exposure, to the interchangeable lens assembly 2. The interchangeable lens assembly 2 computes the panning-shot angular velocity according to the moving velocity of the object on the basis of the object shake information received by the lens MPU 24 and angular velocity shake information from the angular velocity sensor 35. Upon entering the exposure operation, the lens MPU 24 computes the difference between the computed panning-shot angular velocity signal and the detected angular-velocity-sensor signal and corrects the difference, that is, the error between the moving velocity of the object and the panning-shot angular velocity, using the image-shake correction lens 27. Accordingly, the user can easily capture a satisfactory panning shot where there is no shake in the main object while the background is flowing.

While the present invention has been described with reference to the exemplary embodiment, it is to be understood that the invention is not limited to the disclosed exemplary embodiment. The scope of the following claims is to be accorded the broadest interpretation so as to encompass all modifications, equivalent structures and functions.

For example, although the case where the object shake velocity is detected with the rangefinder of the camera 1 has been described by way of example in the above-described embodiment, the similar advantages can be achieved using a camera that has no quick return mirror nor optical viewfinder and that observes an image of an object with an electronic viewfinder. In this case, the object shake velocity can be detected by detecting the motion vector from the image of the object captured with the imager 12.

This application claims the benefit of Japanese Application No. 2005-331425 filed Nov. 16, 2005, which is hereby incorporated by reference herein in its entirety.

What is claimed:

1. A camera system including a camera body and an interchangeable lens assembly attachable to the camera body, the camera system further comprising:

a first shake detection unit configured to detect a shake applied to the optical apparatus;

an object image detection unit configured to detect an image of an object on the basis of light passing through an imaging lens;

a second shake detection unit configured to detect a shake in the image of the object on the basis of an object image signal from the object image detection unit;

an optical axis decentering unit configured to decenter the optical axis of the imaging lens;

an optical axis decentering control unit configured to control driving of the optical axis decentering unit; and a computing unit configured to compute the moving velocity of the object on the basis of a detection result obtained by the first shake detection unit and a detection result obtained by the second shake detection unit, wherein the optical axis decentering control unit causes the optical axis decentering unit to decenter the optical axis of the imaging lens on the basis of the difference between the moving velocity of the object, which is computed by the computing unit, and the detection result obtained by the first shake detection unit.

2. The camera system according to claim 1, wherein the computing unit computes the moving velocity of the object on the basis of the detection result obtained during imaging preparation by the first shake detection unit and the detection result obtained during imaging preparation by the second shake detection result, and wherein the optical axis decentering control unit causes the optical axis decentering unit to decenter the optical axis of the imaging lens on the basis of the difference between the computed moving velocity of the object and the detection result obtained during exposure by the first shake detection unit.

3. The camera system according to claim 1, wherein the computing unit computes a panning-shot velocity on the basis of focal length information of the imaging lens and measured object distance information, and computes the difference between the detection result obtained by the first shake detection unit and the panning-shot velocity, and wherein the optical axis decentering control unit causes the optical axis decentering unit to decenter the optical axis of the imaging lens on the basis of the computed difference.

4. The camera system according to claim 1, wherein the computing unit computes the moving velocity of the object on the basis of the detection result obtained during imaging preparation by the first shake detection unit and the detection result obtained during imaging preparation by the second shake detection unit, wherein, during imaging preparation, the computing unit computes a panning-shot velocity on the basis of the moving velocity of the object, which is computed by the computing unit, focal length information of the imaging lens, and measured object distance information, wherein, during exposure, the computing unit computes the difference between the computed panning-shot velocity and the detection result obtained during exposure by the first shake detection unit, and wherein the optical axis decentering control unit causes the optical axis decentering unit to decenter the optical axis of the imaging lens on the basis of the computed difference.

5. The camera system according to claim 1, wherein the first shake detection unit is a rotational shake detection unit.

6. The camera system according to claim 1, wherein the object image detection unit is a focus detection unit configured to detect a focus state of the image of the object on the basis of the light passing through the imaging lens.

7. The camera system according to claim 1, wherein the object image detection unit is an imaging unit configured to capture the image of the object on the basis of the light passing through the imaging lens.

* * * * *